United States Patent [19]

Peterson

[11] Patent Number: 4,999,057
[45] Date of Patent: Mar. 12, 1991

[54] FLUID TILLER APPARATUS

[75] Inventor: Myron L. Peterson, Kingman, Ariz.

[73] Assignee: Schleicher Electronic GmbH & Co. KG, Fed. Rep. of Germany

[21] Appl. No.: 335,961

[22] Filed: Dec. 19, 1988

[51] Int. Cl.⁵ .............................................. A01C 23/02
[52] U.S. Cl. .................................................... 111/7.1
[58] Field of Search ..................... 111/7.1–7.4; 47/48.5; 294/57, 58, 50.7

[56] References Cited

U.S. PATENT DOCUMENTS

| | | | |
|---|---|---|---|
| 412,479 | 10/1889 | Davis | 294/57 |
| 708,126 | 9/1902 | Chase | 111/7.1 |
| 1,103,484 | 7/1914 | Clarke | 111/7.1 X |
| 1,449,606 | 3/1923 | Horner | 111/7.1 X |
| 1,885,377 | 11/1932 | Robinson | 294/50.7 |
| 1,937,172 | 11/1933 | Starner et al. | 111/7.1 |
| 2,018,003 | 10/1935 | Axtell | 111/7.1 |
| 2,333,727 | 11/1943 | Lucas | 111/7.1 |
| 2,850,992 | 9/1958 | Hooper et al. | 111/7.1 |
| 2,906,056 | 9/1959 | Youngblood | 111/7.1 |
| 3,026,827 | 3/1962 | Cunningham | 111/7.1 |
| 3,834,329 | 9/1974 | Suggitt | 111/7.3 |
| 4,466,490 | 8/1984 | Eckels | 111/7.1 |
| 4,819,735 | 4/1989 | Puckett | 294/50.7 |

FOREIGN PATENT DOCUMENTS

| | | | |
|---|---|---|---|
| 422712 | 1/1935 | United Kingdom | 111/7.1 |
| 896742 | 5/1962 | United Kingdom | 294/58 |

Primary Examiner—Danton D. DeMille
Attorney, Agent, or Firm—Barnes & Thornburg

[57] ABSTRACT

A garden tilling tool having a soil penetrating portion in the form of a tine. The tool may be formed with a single tine or a multiple tine tool in the form of a garden fork or the like. Each tine has an opening adjacent to the end thereof, or formed in the end thereof, attached to, or integrally formed with, the tool are fluid delivery means, including a coupler for connection to a garden hose or the like, a valve for selectively controlling the flow of water through the coupler from a pressurized municipal water source, through the opening into contact with the soil upon penetration of the tine. In an embodiment, a water passage manifold communicates with a jet tube having an open end in close proximate relation to the end of the tine for passing water through the tool at the point of contact with the soil. A water backsplash shield is provided on the tool adjacent the soil penetrating end, and is slidable to permit initial positioning near the bottom, with slidable upward movement of the shield as it makes contact with the soil during penetration by the tine.

4 Claims, 2 Drawing Sheets

FLUID TILLER APPARATUS

BACKGROUND OF THE INVENTION

The background of the invention will be discussed in two parts.

1. Field of the Invention

This invention relates to soil tilling apparatus, such as a garden tool having a soil penetrating blade, and more particularly, to tilling apparatus having a pressurized fluid dispensable in a jet stream in proximate relation to the soil penetrating blade of the tool with a shield adjacent the water dispensing end to minimize back splash of water on the user.

2. Description of the Prior Art

With garden tilling apparatus, a common tool employed is the garden fork, which has three or four tines or prongs formed as blades of steel with a common transverse interconnection member and a handle extending therefrom. The interconnection member is usually formed integrally with the tines, and is used as a foot engaging edge to urge the tines into penetrating engagement with the soil. The handle is configured for hand gripping to assist in applying downward pressure to the garden fork during tilling. The ability to penetrate the soil with a garden fork is highly dependent on the condition and moisture content of the soil. Once the tines of the fork enter the soil, the fork is pivoted, in the manner of a pry bar, and then the soil on the fork is turned, and the clump of earth broken up. The process is then repeated until the area to be tilled is finished ready for further processing, such as fertilization and planting. With dryer soil, or harder soil, the efforts in tilling with a garden fork may be very strenuous.

Various tools have been devised to assist in gardening. One such apparatus is disclosed in U.S. Pat. No. 1,525,571, entitled "Irrigating and Spadinf Fork", such patent issuing on Aug. 11, 1924, to Cypert, the device including a tilling fork with a pipe connected at the top of the cross-bar of the tines of the fork, but not at the ends of the tines where they penetrate the earth.

U.S. Pat. No. 3,289,418, entitled "Sub Soil Irrigating Means", issued to Edgerton on Feb. 28, 1964, such patent disclosing a structure in which a hollow box is provided with a fluid coupler for permitting fluid to flow therein; however this device requires that downward force be applied through a handle in order for water to flow through the device.

Another apparatus useful in gardening is shown and described in U.S. Pat. No. 3,143,984, entitled "Garden Tool", such patent issuing to Morasch on Oct. 22, 1962, the device being directed to a hoe-like tool having means for fluid to travel through the extended handle thereof with water outlets at the top cross-bar of the hoe, but not at the penetrating edge of the hoe.

Still another apparatus useful in gardening is shown and described in U.S. Pat. No. 2,181,189, entitled "Garden Tool", such patent issuing to Lathan on Sept. 17, 1938, the device being directed to a fork-like tool having means for fluid to travel through the extended handle thereof with a water outlet at the bottom of the handle, but not at the penetrating fingers of the fork. The device of this patent as well as the aforementioned patents are lacking, in that they do not disclose a penetrating member having fluid dispensing means therein at the point of soil penetration to assist in working of the soil, but merely provide some form of conduit for a fluid.

Other fluid dispensing apparatus are shown and described in U.S. Pat. No. 3,113,703, issued Dec. 10, 1963 to Rundle, and U.S. Pat. No. 3,410,457, issued to Brown on Nov. 12, 1968. However, such devices are directed to kitchen tools for enabling dispensing of cooking fluids, such as oil and seasonings, and are not considered relevant to the invention herein.

In accordance with an aspect of the invention, it is accordingly an object of the invention to provide a new and improved tined garden tilling tool having means for controllably providing water under pressure adjacent the tips of the tines to assist in tilling the soil, with a shield provided for precluding backsplash of water during use.

SUMMARY OF THE INVENTION

The foregoing and other objects of the invention are accomplished by providing a garden tool having a soil penetrating portion in the form of at least one elongate blade-shaped tine. The tool may have a single tine or multiple tines, such as in the form of a garden fork. Attached to, or integrally formed with, the tine or tines are fluid delivery means, including a coupler for connection to a garden hose or the like, a valve for selectively controlling the flow of water through the coupler from a pressurized municipal water source, and a water passage manifold communicating with a jet tube having an open end in close proximate relation to the end of the tine for passing water through the tool at the point oi contact with the soil. The lower end oi the tool is provided with a shield to preclude splashing oi water back at the operator. The shield is slidably attached to the single tine tool and may be likewise attached to the garden fork embodiment.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
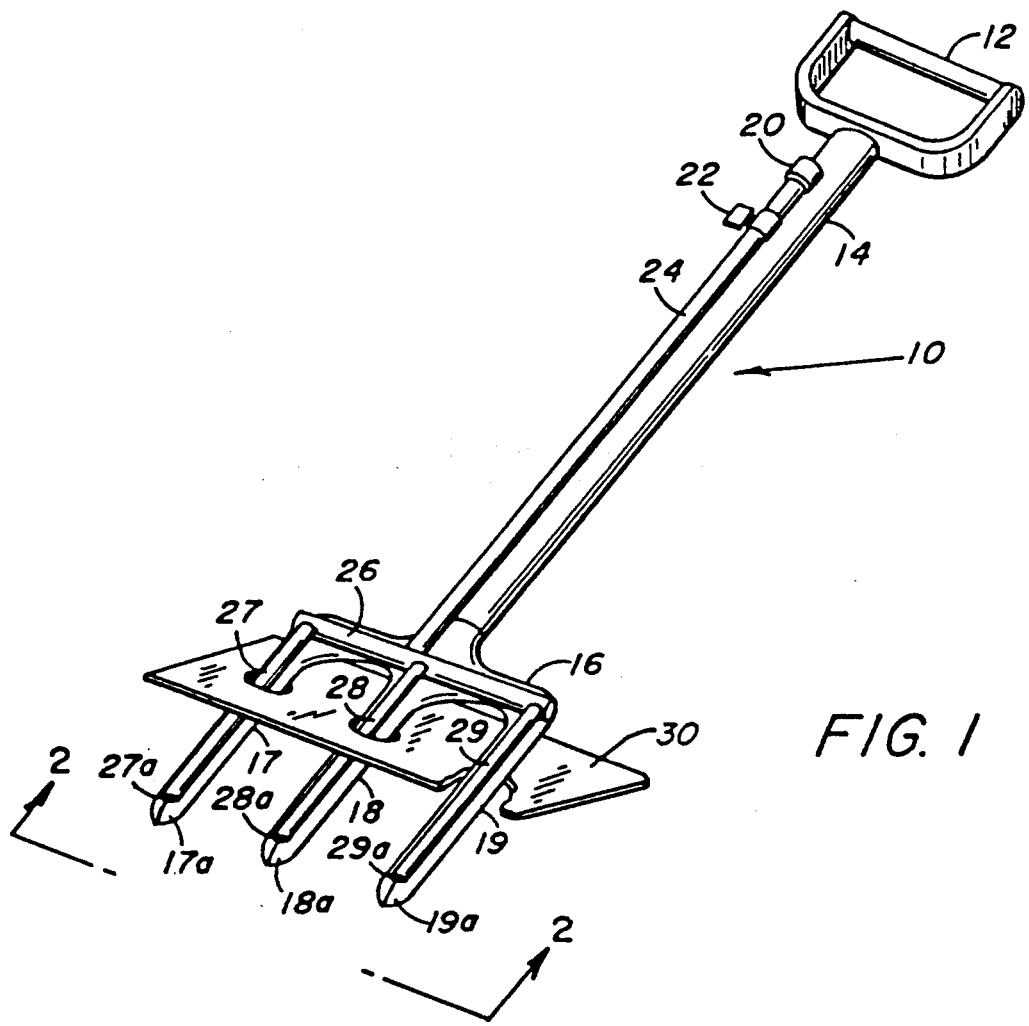
FIG. 1 is a perspective view of the reverse side oi the pressurized fluid dispensing tilling tool apparatus according to the invention.
Figure 2:
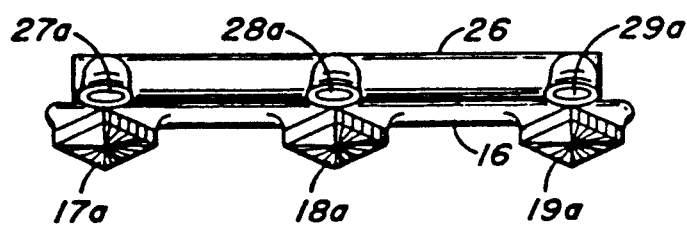
FIG. 2 is an end view of the lower end of the tool of FIG. 2, as viewed generally along line 2—2 thereof.

Referring now to the drawings, and particularly to FIGS. 1 and 2, there is shown the fluid dispensing tilling apparatus, generally designated 10, which in one embodiment shown is in the form of a garden fork. The apparatus 10 includes a handle portion 12, a handle 14, and a fork end including a transversely extending member 16 interconnecting, or formed integrally with a plurality of tines 17, 18 and 19. The member 16, along with the tines 17–19 are usually integrally cast or forged as one piece, of steel, with the tines 17–19 being formed as elongate blade-shaped members having pointed ends 17a, 18a and 19a, respectively, for entering into and penetrating the soil. The upper edge of the member 16 serves conveniently as a support for a foot of the user to enable application of pressure when using the tool for tilling.

In accordance with the invention, pressurized fluid dispensing means are provided and include a garden hose connector or coupling 20 in fluid communication with a manually controllable valve 22, in turn in fluid communication with a tubular member 24, coupled to a manifold 26, which is in turn coupled, again in fluid flow communication with a plurality of tubular members 27–29, each of which coacts with a tine 17–19, respectively, with the lower end of each tubular member 27–29 having a discharge opening 27–29a, respectively (See FIG. 2). In a more simple embodiment, although not shown in the drawings, manifold 26 could be eliminated, with members 27–29 then connected directly to valve 22.

The discharge or jet openings 27–29a are small orifices formed by tapering the ends of the tubes 27–29 or may be attached fittings, which are positioned adjacent or in close proximate relation to the ends 17–19a of the blades 17–19 of the tool 10, that is in the longitudinal direction, from the ends 17–191, the openings 27–29a of the tubular flow direction tube members 27–29 are spaced slightly therefrom. This spacing maintains the discharge openings in proximate relation to the soil penetrating ends 17a–19a of the tines 17–19 of the fork tool 10 during use. In use, the soil penetrating ends 17a–19a of the tines 17–19 enter the soil almost concurrently.

The fluid dispensing apparatus may be directly secured to an existing garden fork, that is the tube 24, the manifold 26 and the tine tubes 27–29 may be formed as a separate unit, along with the valve 22 and hose coupler 20. As a unit the water dispensing assembly may then be suitably attached to the garden fork, such as by welding or the like. Alternatively, the apparatus 10 may be at least partially integrally formed with the tool during manufacture. In either event, in use, a garden hose (not shown) is connected to the coupler 20, with the valve 22 closed, and the faucet or valve for the hose opened. The tool 10 is then used with the tines entering the soil. If resistance is met, the valve 22 may then be opened to permit the flow of water, under pressure, through the tube 24, through the manifold 26 through the tine tubes 27–29 for discharge through the jet tube openings 27–29a. As the tines enter the earth or soil, the water jet streams from the openings 27–29a cuts its way into the soil to assist in the penetration.

During turning of the soil, the water jets also facilitate breaking up of any soil clumps, while simultaneously providing moisture to the turned soil. In addition, the moving high speed water assists in aeration of the soil as the water enters the tilled soil.

To minimize backsplash of the water as it impacts with the soil, the tool 10 is provided with water backsplash shield means, such as a shield member 30 having three holes therein for engaging the three tines 17–19 of the tool 10, with the shield 30 being slidably positioned thereon. The shield 30 may also be readily detached for cleaning both the shield 30 and the tool 10. In use, the shield 30 is slid down the times 17–19 to a position a short distance from the ends of the tInes 17–19. When the tines 17–19 enter the soil a short distance, the shield 30 then contacts the soil, after which, with further penetration, the shield 30 slides up the tines 17–19, at all times protecting the user from any water backsplash which may occur during use of the tool 10. The shield 30 is somewhat flexible yet somewhat rigid, and may be formed of any convenient material, such as a thick plastic screen material, clear or opaque plastic sheet material, or rubberized fabric, or the like, and need not be totally water impermeable. By way of example, the shield 30 may be formed of flexible, yet rigid sheet material, with the tine engaging holes configured and dimensioned for slight frictional engagement with the tines when the shield 30 is positioned thereon, this frictional engagement serving to maintain the shield 30 in a given position on the tines 17–19. For initial positioning, the user manually, or by foot, urges the shield 30 down the tines 17–19 to a position intermediate the length of the tines, and thereafter, as previously stated, the shield 30 upon contact with the soil, slides upwardly in response to the soil engagement as the tines continue penetration of the soil.

In plan elevation, the configuration may take any convenient form, such as circular, rectangular, or ellipsoidal, and the tine engaging apertures need not be centered with respect to the material or fabric. In the embodiment illustrated, the shield 30 is rectangular in form, with the tine engaging apertures positioned along one edge, that is a forward edge, with the operator or user positioned rearwardly of the shield 30 where the majority of the shield 30 is located.

Figure 3:
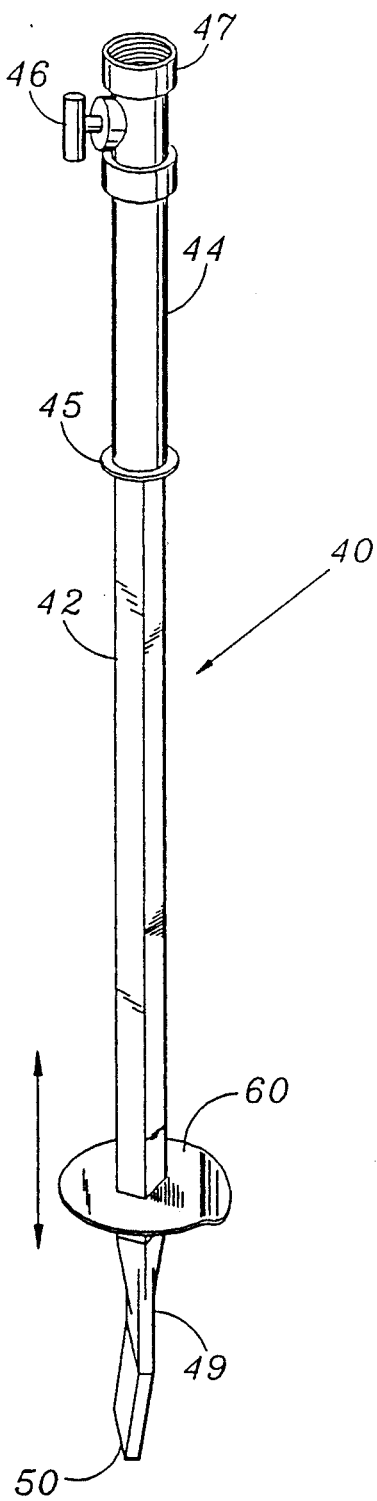
FIG. 3 is a perspective view of an alternate embodiment of a tool in accordance with the invention.

FIG. 3 shows an alternate, economical, mechanically uncomplicated embodiment of a tool 40, which includes an elongate member 42, having a handle 44 adjacent the upper end thereof. The handle 44 may be a plastic or rubber sleeve member frictionally engaging elongate member 42 with the handle 44 having a lower flange portion 45 integrally formed therewith. The flange portion 45 facilitates application of pressure on the tool 40 by precluding hand slippage. A valve 46 has one end thereof connected to the upper end of elongate member 42, in series with the opening through the member 42, with a garden hose coupler 47 attached to the other end of the valve 46.

The coupler 47, valve 46 and elongate member 42 define a water flow passage for water entering from a water hose through the coupler 47, through the valve 46 and through the lower end 49 of member 42. To provide a jet action, the lower end of member 42 is tapered or formed to form a tine end, that is a pointed end for soil penetration, with an opening or orifice 50 which is of a small diameter for providing a jet flow of water therethrough. To protect the user from backsplash of the water passing through the orifice 50, a shield member 60 is slidably affixed to elongate member 42 adjacent the lower end thereof. The shield member 60 may be initially positioned adjacent the tapered tip 49, and, as the soil penetrating end 49 enters the soil, the shield, upon contact with the soil, moves axially up the member 42.

The shield member 60 may be formed of any of the materials mentioned with reference to the shield member 30, and may take any convenient shape. In the embodiment depicted, the shield 60 is generally circular with the tube engaging aperture adjacent the center thereof. The user can rotate the shield 60 to the position which provides the most protection from splashing water, as well as adjust the shield 60 axially along elongate member 42.

Likewise, elongate member 42 may be formed of any convenient materials and may take any convenient shape. In the embodiment depicted, elongate member 42 is shown rectangular in cross-section but may be comprised of circular or tubular material.

Three jet stream producing openings have been described, however, one or two or more may be conveniently employed, with the jet stream producing openings adjacent, or in proximate relation, to the tine or blade end to effect jet stream action near the blade during use.

Although the apparatus 10 and 40 have been described in conjunction with a garden fork, the water dispensing portion may be equally used with other soil penetrating tools, with a penetrating blade portion, such as a garden spade. For instance, with selected configurations, the device makes an excellent reforesting tool in that the hole for the seedling can be made and watered in one operation. In addition, the tool works well for transplanting plants, for deep watering, aerating, loosening soil prior to digging holes or trenches, and even for watering eaves and hard to reach windows as it produces a spray that reaches approximately 30 feet at standard water pressure of about 55 psi.

While there have been shown and described preferred embodiments, it is to be understood that various other adaptations and modifications may be made within the spirit and scope of the invention.

What is claimed is:

1. A hand manipulable tool for use in tilling the soil, said tool comprising:
   an elongate handle for grasping by a user at one end;
   a soil penetrating portion at the other end of said handle and having a plurality of tine members, each of said tine members having an end in fixed relation to said handle for penetrating the soil upon application of force to the tool;
   fluid delivery means including
   (a) tube means attached to said handle and including coupler means for connection to a garden hose or the like;
   (b) valve means in fluid flow relation with said tube means for enabling selective control of the flow of water through the coupler from a pressurized municipal water source with a hose connected thereto, said valve means being positioned adjacent said one end of said handle for operation by the user during use of the tool;
   (c) water passage manifold means in fluid flow communication with said valve means and having at least one opening adjacent the soil penetrating end of each of said tine members for enabling said opening to penetrate the soil concurrently with said end, said fluid delivery means enabling the selective control and passing of water under pressure through said manifold means and through said at least one opening for contact with the soil to assist in tilling the soil; and
   water backsplash shield means having apertures therein for receipt of said tine members therethrough for slidably coupling to said tine members for enabling initial positioning of said shield means adjacent the tine ends and permitting said shield means to axially move along said tine members in response to contact with the soil as said tine members enter the soil.

2. Apparatus for use in tilling the soil, said apparatus comprising:
   a garden fork having a handle member with a gripping portion at one end and a plurality of soil penetrating tine members at the other end;
   a generally elongate member defining a fluid flow passage, said elongate member being attached to the handle of the garden fork with one end adjacent the gripping portion;
   coupler means attached to the elongate member for connection to a garden hose or the like; valve means interconnecting said elongate member and said coupler means for selectively controlling the flow of water through the coupler from a pressurized water source, said valve means being attached in proximate relation to said one end of said elongate member for enabling control of flow by the user;
   manifold means at the other end of said elongate member in fluid flow relation therewith;
   a plurality of generally tubular members in fluid flow relation with said manifold means, the number thereof being equal to the number of tine members in the garden fork, each of said tubular members having a fluid discharge opening at the end thereof, said manifold means and said tubular members being configured and dimensioned to correspond to the configuration of the tine end of said garden fork and intimately attached to the tine end of said garden fork with each of the tine members having one of said openings adjacent the end of each tine for enabling said openings to penetrate the soil along with the tine members, operation of said valve means enabling the selective control and passing of water under pressure through said manifold means and through said openings for contact with the soil to assist in tilling the soil with said apparatus attached to the garden fork; and
   water backsplash shield means for slidably coupling to the thus attached tubular members and the tine members for enabling initial positioning of said shield means adjacent the tine ends and permitting said shield means to axially move along the thus attached tubular members and tine members in response to contact with the soil as said tine members enter the soil.

3. A hand manipulable tool for use in tilling the soil, said tool comprising:
   a generally elongate handle configured for grasping at one end by a user;
   a soil penetrating portion secured to said handle at the other end and having a plurality of tine members, each having an end in fixed relation to said handle for penetrating the soil upon application of force to the tool;
   fluid delivery means including
   (a) a tubular fluid passage member;
   (b) coupler means for connection to a garden hose or the like;
   (c) valve means interconnecting one end of said tubular member and said coupler means for selectively controlling the flow of water through the coupler from a pressurized water source;
   (d) water passage means in fluid flow communication with said tubular member and having a plurality of tubular portions equal in number to said plurality of tine members, each of said tubular portions having an opening at an end thereof, said fluid delivery means being configured for mating engagement with and attached to said handle and said soil penetrating portion with said valve means in proximate relation to said one end of said handle for enabling control of flow by the user, and with each of said openings adjacent a corresponding end of one of said tine members for enabling said openings to penetrate the soil concurrently with the ends of said tine members, said fluid delivery means enabling the selective control and passing of water under pressure through said water passage means and through said at least one opening for contact with the soil to assist in tilling the soil; and water backsplash shield means for slidably coupling to the thus attached tubular portions and the tine members for enabling initial positioning of said shield means adjacent the tine ends and permitting said shield means to axially move along said the thus attached tubular portions and tine members in response to contact with the soil as said tine members enter the soil.

4. The tool according to claim 3 wherein said tine members are blade-shaped tine members formed of metal and said water passage means are formed of metal and welded to the undersurface of said tine members.

* * * * *